Figure 6:
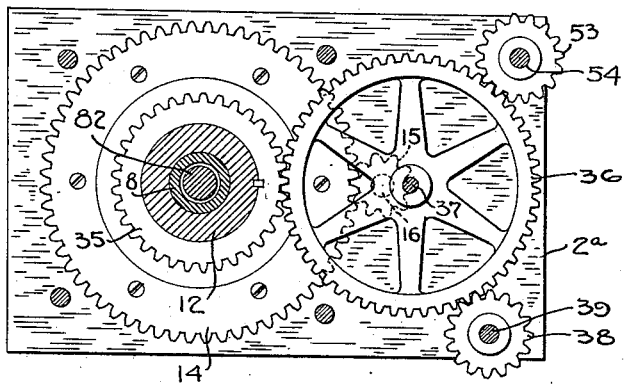

June 12, 1923.
G. H. STEWARD
1,458,735
MULTIPLE SPINDLE CRIMPER FOR CAPPING CONDENSED MILK CANS AND THE LIKE
Filed April 13, 1920
7 Sheets-Sheet 1
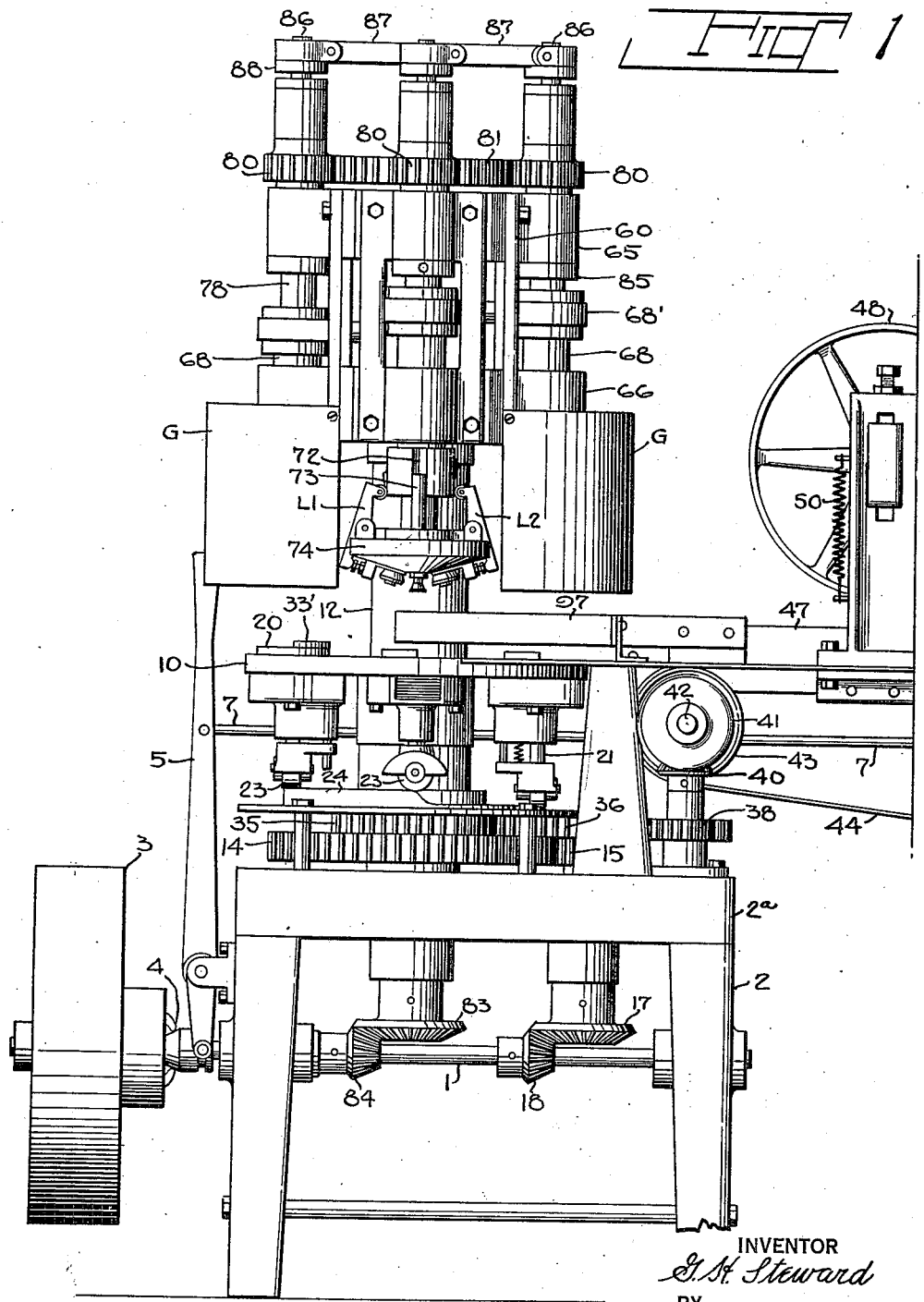

June 12, 1923.
G. H. STEWARD
1,458,735
MULTIPLE SPINDLE CRIMPER FOR CAPPING CONDENSED MILK CANS AND THE LIKE
Filed April 13, 1920
7 Sheets-Sheet 2
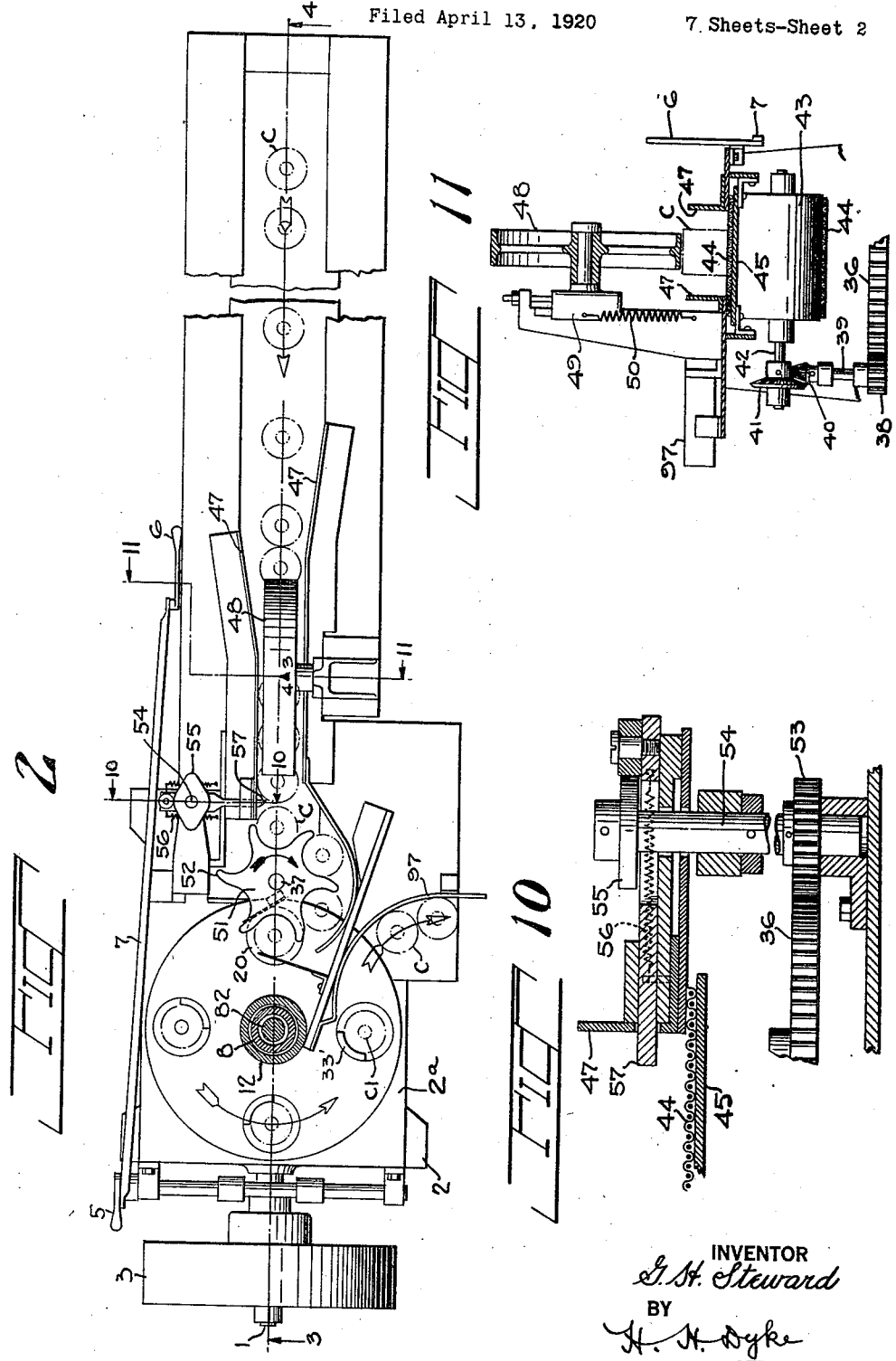
INVENTOR
G. H. Steward
BY
H. H. Dyke
ATTORNEY

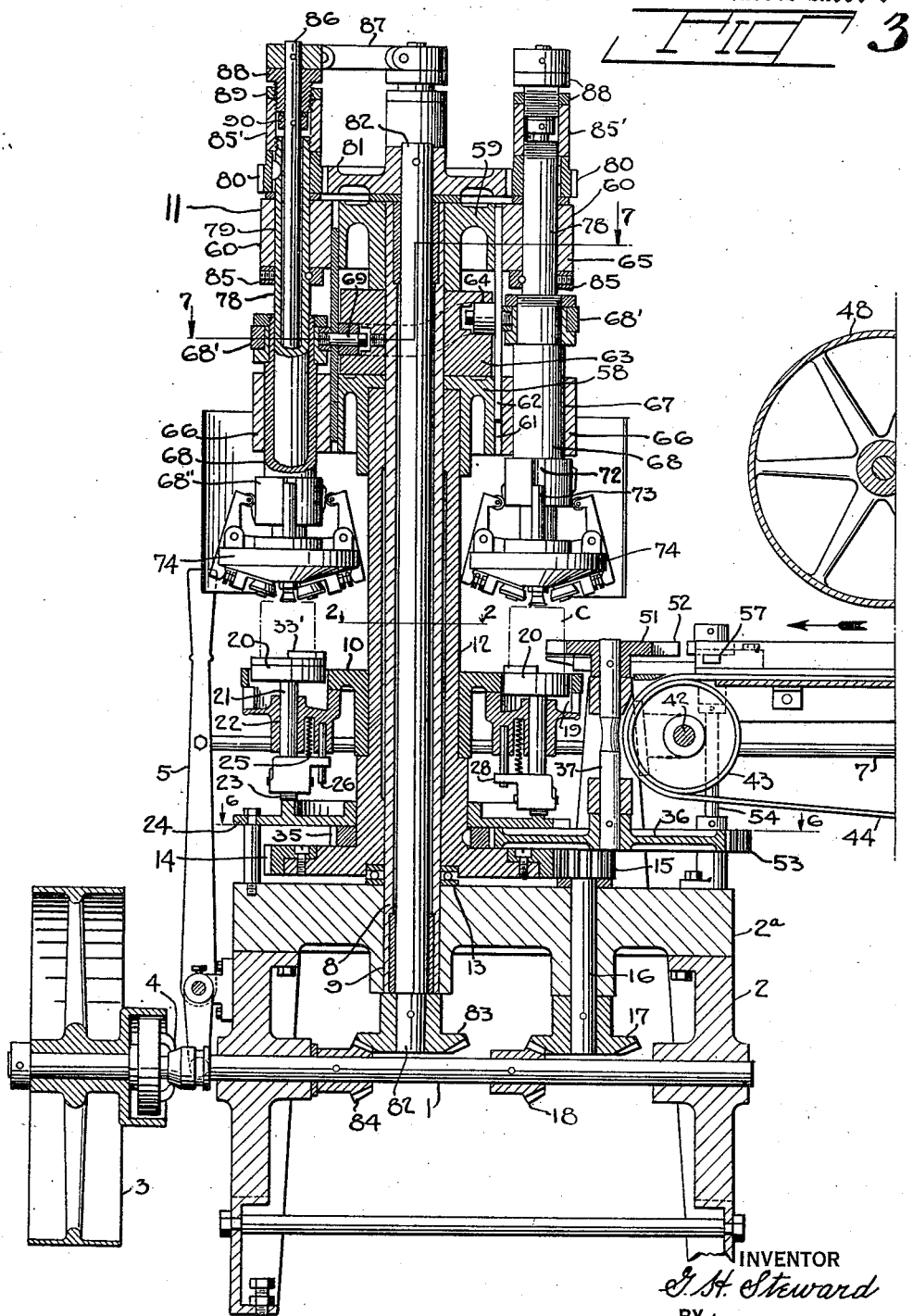

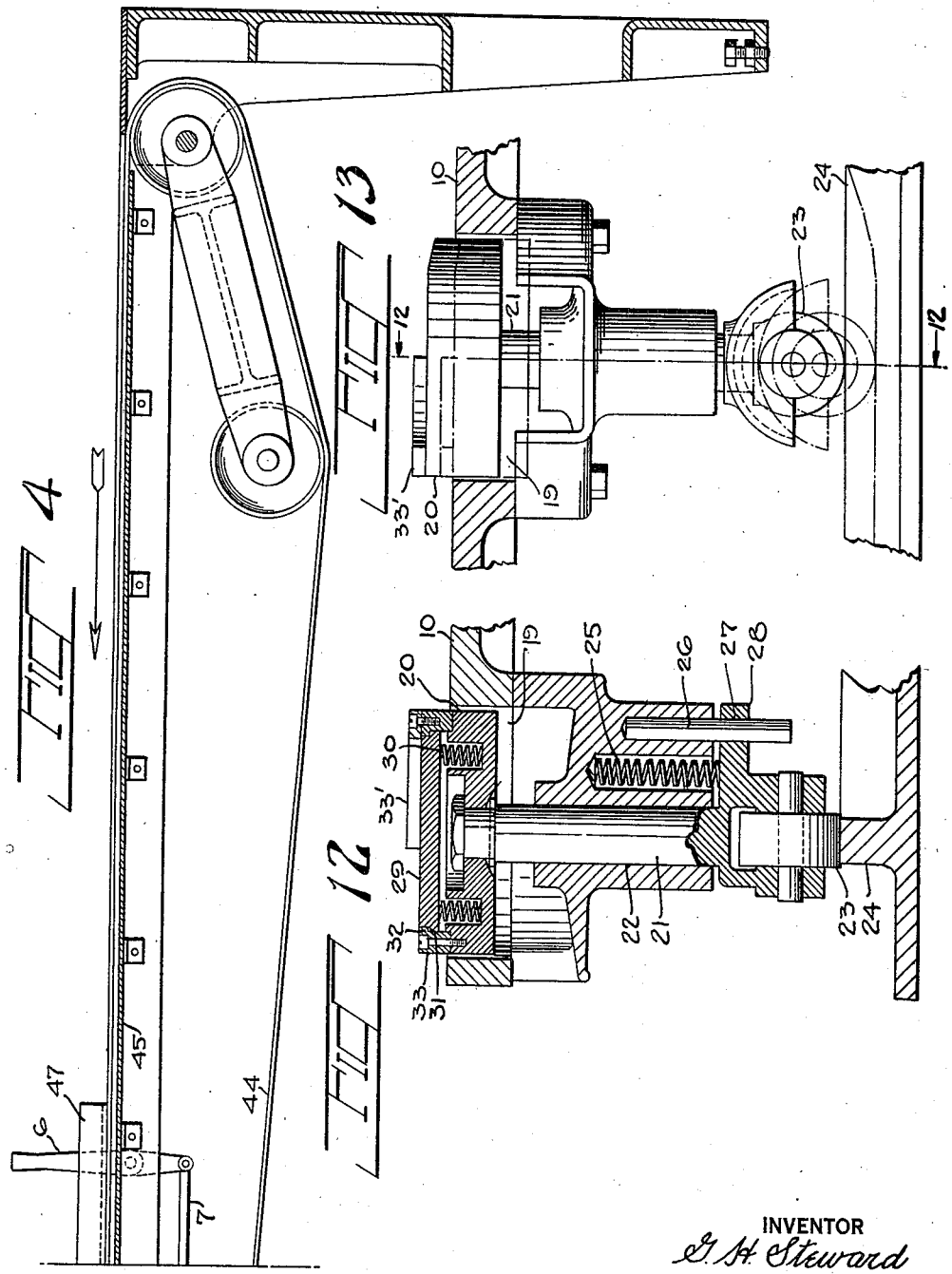

June 12, 1923.

G. H. STEWARD 1,458,735

MULTIPLE SPINDLE CRIMPER FOR CAPPING CONDENSED MILK CANS AND THE LIKE

Filed April 13, 1920     7 Sheets-Sheet 5

INVENTOR
G. H. Steward
BY
H. H. Dyke
ATTORNEY

June 12, 1923.
G. H. STEWARD
1,458,735
MULTIPLE SPINDLE CRIMPER FOR CAPPING CONDENSED MILK CANS AND THE LIKE
Filed April 13, 1920 7 Sheets-Sheet 6
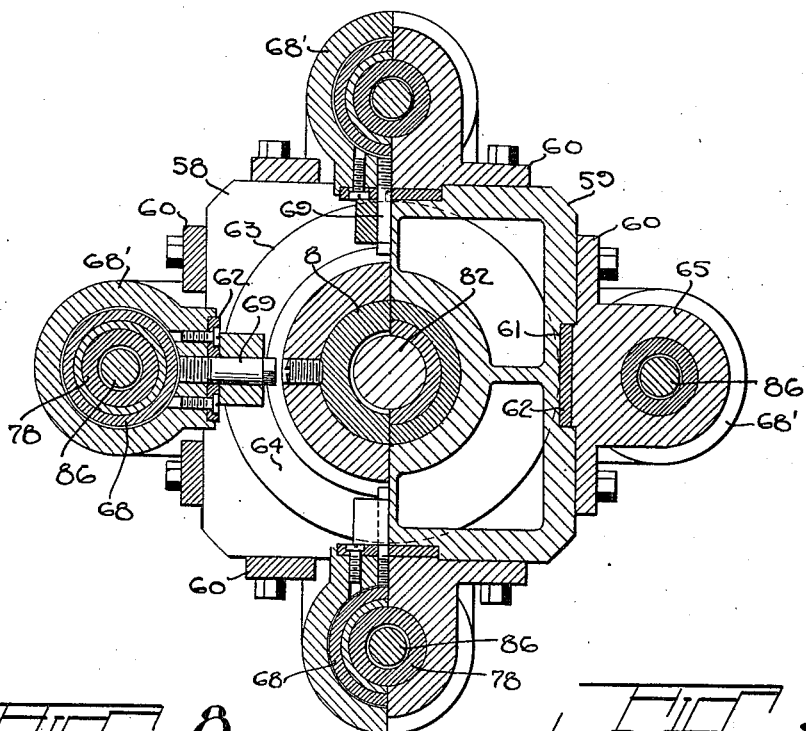
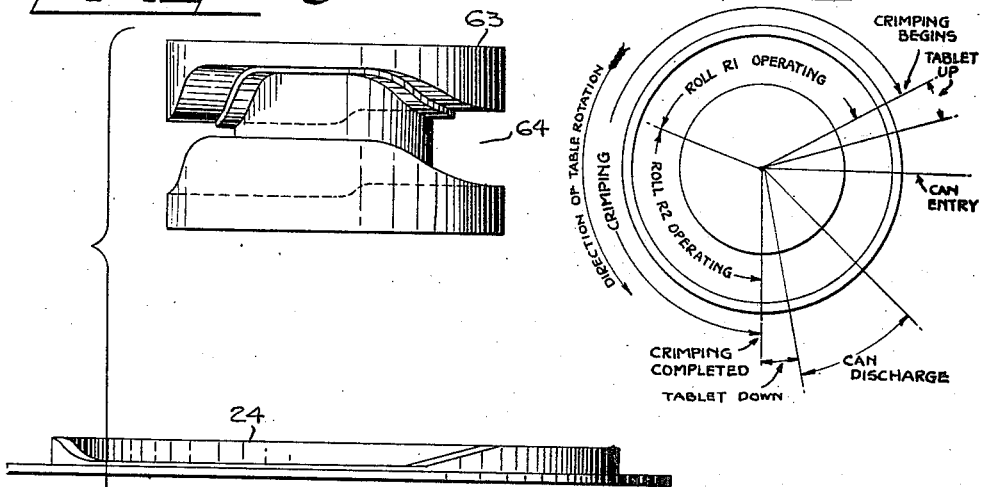
INVENTOR
G. H. Steward
BY
H. H. Dyke
ATTORNEY June 12, 1923.
G. H. STEWARD
1,458,735
MULTIPLE SPINDLE CRIMPER FOR CAPPING CONDENSED MILK CANS AND THE LIKE
Filed April 13, 1920  7 Sheets-Sheet 7
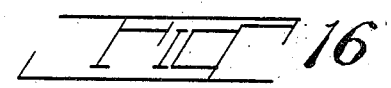
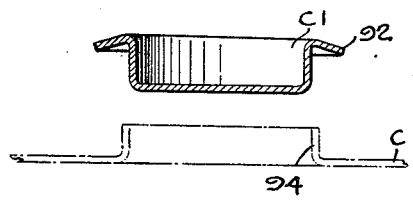
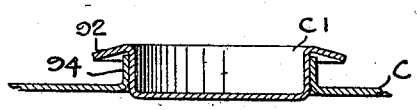
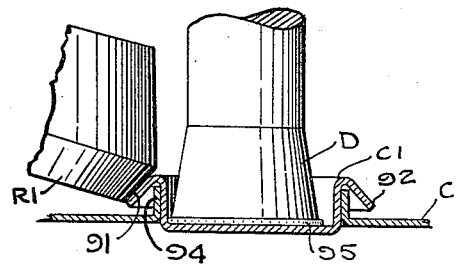
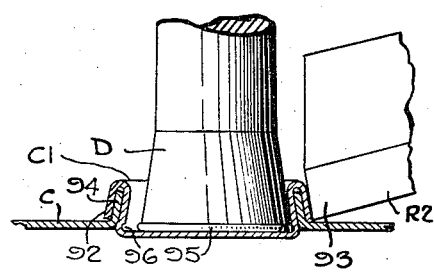
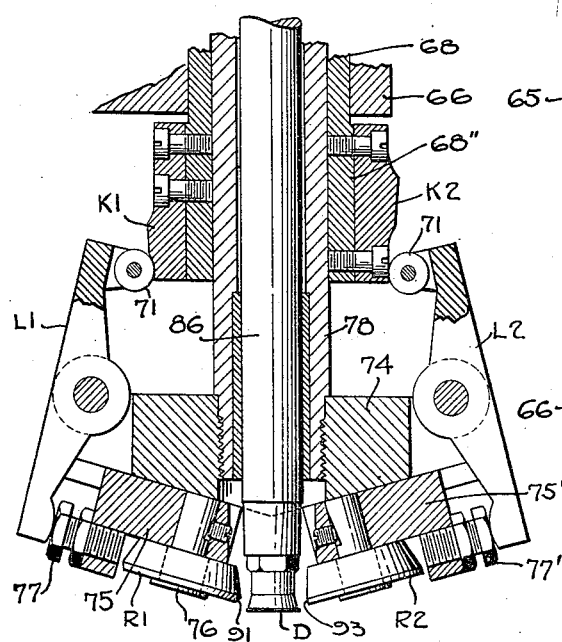
INVENTOR
G. H. Steward
BY
H. H. Dyke
ATTORNEY Patented June 12, 1923.

1,458,735

UNITED STATES PATENT OFFICE.

GEORGE H. STEWARD, OF RUTLAND, VERMONT.

MULTIPLE-SPINDLE CRIMPER FOR CAPPING CONDENSED-MILK CANS AND THE LIKE.

Application filed April 13, 1920. Serial No. 373,661.

*To all whom it may concern:*

Be it known that I, GEORGE H. STEWARD, a citizen of the United States, residing and having a post-office address at Rutland, county of Rutland, and State of Vermont, have invented certain new and useful Improvements in Multiple-Spindle Crimpers for Capping Condensed-Milk Cans and the like, of which the following is a specification.

My invention relates to a crimping machine for crimping caps about the small filling openings in the heads of cans used for containing materials such as condensed milk and the like.

With a large class of materials, of which condensed milk is a representative type, it has been found desirable to provide a can having a relatively small filling opening in the head. The material of the can head is preferably flanged outwardly about such small filling opening, which is usually considerably under an inch in diameter, and when the material, such as condensed milk, is put into a can so constructed, the filled cans can be handled, as in conveyors or the like, before being capped, without slopping or splashing out, as frequently happens with open-top cans, much saving of the contents can be effected, and the operations can be carried on in a clean and sanitary manner.

The machine of the present invention has been constructed for capping such cans after they are filled by automatically crimping suitably formed caps in place thereon. The caps are secured permanently in place by crimping or spinning them over a flange formed in the can head about the margin of the filling opening. To open the can it is ordinarily not feasible to pry off or otherwise remove the caps, which are solidly crimped in place, but the can head has to be opened in other ways, as by being cut open with a can opener, or, in the case of condensed milk, for example, the contents may be removed by the common device of punching one or more holes in the can.

The object of the present invention is the provision of an automatic machine for crimping caps in place on cans of the type above referred to, and with this and other related objects in view, the invention consists in the combinations and features of construction herein set forth and claimed.

In the accompanying drawings, I have shown the preferred embodiment of the invention for the purpose of affording a clear understanding of the invention, and not for limitation of the invention.

Figure 5:
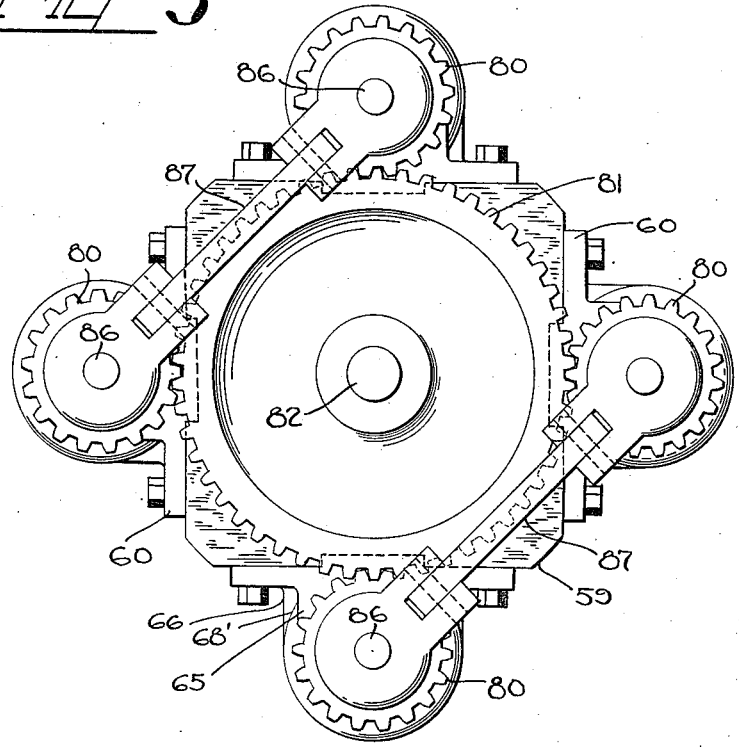

In the said drawings Fig. 1 is a side view of the machine, with one of the crimper head guards removed. Fig. 2 is a plan view of the machine with the turret construction removed on section line 2—2, Fig. 3. Fig. 3 is a central vertical sectional view of the machine. Fig. 4 is a continuation of Fig. 3, showing the feeding conveyor. Fig. 5 is a top or plan view of the turret. Fig. 6 is a section on line 6—6, Fig. 3. Fig. 7 is a sectional view taken substantially on the broken line 7—7, Fig. 3. Fig. 8 is a side view showing the relation between the crimping roller cam and the can tablet cam. Fig. 9 is a diagrammatical view indicating the sequence of operations performed. Fig. 10 is a sectional detail view taken on line 10—10, Fig. 2, and showing the operation of the can retarding latch. Fig. 11 is a detail sectional view taken substantially on the broken line 11—11, Fig. 2, and showing the feeding conveyor drive mechanism, and the wheel for pressing the caps in. Fig. 12 is a sectional detail view taken on the line 12—12, Fig. 13, and showing the means for effecting vertical movement of the can tablets in the table. Fig. 13 is a side view of the parts shown in Fig. 12. Fig. 14 is a central vertical section through one of the crimping heads. Fig. 15 is a cross-sectional view showing the cap about to be placed in the opening in the can. Fig. 16 is a similar view showing the cap inserted into place in the can. Fig. 17 is a cross-sectional detail view showing the position of the parts during the first crimping operation. Fig. 18 is a view similar to Fig. 17, and showing the second and final crimping operation; and Fig. 19 is a detail perspective view of one of the spindle bearing members.

Power is supplied by means of drive shaft 1, mounted in the machine frame 2 and preferably low down therein close to the floor. The shaft 1 may be driven in any suitable manner, as, for example, from the belt pulley 3 adapted to be clutched to and unclutched from the shaft 1 by clutch mechanism 4. The clutch device is controlled by hand lever 5, or by auxiliary lever 6, connected to lever 5, as by means of the link 7, and located adjacent to the feed conveyor, or elsewhere, where access thereto may conveniently be had.

A hollow standard 8 is fixed in an opening 9 of the machine bed plate 2$^a$ and extends upwardly therefrom. The revoluble can table 10 and the crimping turret, designated generally by reference numeral 11, turn about this standard as an axis. The can table 10 is fixed to the sleeve member 12, which turns on the standard 8, and is preferably supported on a ball thrust bearing 13. The table 10 is revolved by means of spur gear 14, fixed on the sleeve member 12, and rotated by pinion 15, fixed on shaft 16. Shaft 16 is provided with a bevel gear 17, which is driven from the bevel pinion 18 on shaft 1.

The revoluble can table 10 is provided with a plurality of recesses 19 for receiving the can tablets (small tables) 20. In the form shown there are four recesses 19 and four can tablets 20. The can tablets 20 are supported upon stems 21 extending down through openings 22 in the can table 10. Stems 22 are provided with rollers 23 which run on and follow a stationary cam 24 secured to the bed plate 2$^a$. Springs 25 serve to hold the rollers 23 down upon the cam 24. Guide pins 26 passing through openings 27 in the lateral extensions 28, formed in or secured to the can tablet stems 21, serve to prevent tablets 20 from rotating on the axis of stems 21, while at the same time permitting same to be moved up and down, as the table 10 is revolved with the rollers 23 in contact with cam 24.

The tops of the can tablets 20 upon which the cans are supported during the operation of the machine are preferably constructed so as to be adapted to yield somewhat under pressure, thereby accommodating the machine for use with cans of slightly different lengths. In the form shown, the cans are supported on discs 29, spring pressed upwardly by springs 30, and having a shoulder 31, which is spring pressed against a shoulder 32, provided on the marginal ring 33. The part circular, or quadrant shaped gauge 33′ is provided to engage the can and keep it in proper position on the tablet 20.

While the cans may be delivered to the crimping apparatus by hand or by any suitable means, the feeding apparatus in the machine shown is built into the machine and forms a part thereof. In the form shown the cans are delivered by a belt conveyor. The conveyor drive comprises a spur gear 35 fixed on sleeve 12, and meshing with the spur gear 36 on shaft 37. Gear 36 actuates the pinion 38 on the shaft 39, which also carries the bevel pinion 40, meshing with the bevel gear 41 on the shaft 42 of belt pulley 43, by which the belt 44 is driven. The upper run of the belt 44 is supported by the flat supporting plate 45. Belt 44 serves to advance the cans C between the guides 47 and to deliver same to the crimping mechanism.

When the cans C are held against moving by any suitable means, such as the latch hereinafter described, the belt 44, which is preferably of canvas, or the like material, still continues to move with the cans stationary thereon. The cans advance with the moving belt as soon as they are freed.

As the cans C are moved along by the belt 44, they pass under the wheel 48, mounted in the vertically slidable member 49, and yieldably held down by means of spring 50. The downwardly spring-pressed wheel 48 serves to press the caps C$^1$ into the openings in the heads of the cans C, and after passing wheel 48 the position of the caps C$^1$ with respect to cans C is as shown in Fig. 16. It should be noted that the cans, when delivered to the feeding belt 44 by an operator, or otherwise, have the caps C$^1$ in place thereon, but it may frequently happen that the caps are not pushed down as far as they will go, and the provision of the wheel 48 assures that, when the cans are introduced into the machine, the caps are properly in place therein and ready to be secured in place in their correct positions by means of the crimping device.

The shaft 37 of gear wheel 36 carries the pronged star wheel or dial 51, having the prongs 52, which, as shaft 37 is rotated, engage the cans C and advance same to the can tablets 20 of the revolving can table 10, the driving elements being so timed that the dial 51, here shown as having six prongs, makes ⅙ of a revolution, while the table 10, having four can tablets 20, makes ¼ of a revolution.

Gear 36 also meshes with and rotates pinion 53 (Fig. 6) on shaft 54. Shaft 54 has the cam 55 secured thereto, which serves with the springs 56, 56 to reciprocate the latch, or finger, 57, across the path of cans C, as they are delivered by belt 44. Said latch serves to hold the cans back and to permit but one can to pass at a time to the pronged dial 51, which in turn delivers same to the can table 10. In this way there is no clogging of the can feed which might result in "pinching" some of the filled cans and ejecting a part of the contents thereof.

The crimping turret 11 comprises a pair of separated hubs 58, 59, the lower one of which, 58, is fixed to the sleeve member 12, and the upper one, 59, turns on the hollow standard 8. Hubs 58 and 59 are preferably substantially rectangular in form, and are secured firmly together by means of the spindle bearing members 60, bolted to each thereof and arranged one on each of the four sides of the hubs 58, 59. Slide ways 61 are formed between the spindle bearing members 60 and the hubs 58, 59 for the reception of slide bars 62. The hubs 58 and 59 and the spindle bearing members 60, by which they are rigidly connected together, provide a turret 11 having an elongated bearing and adapted to receive and support the crimping spindles in such manner that the crimping operation can be accurately and rapidly performed.

Between the hubs 58, 59 there is fixed on the tubular spindle 8 a cam 63, having a cam groove 64 formed therein. The spindle bearing members 60 are extended outwardly at their upper ends, as shown at 65, and also are provided with similar extensions 66 at their lower ends. The lower end extensions 66 are provided with bearing openings 67 for the reception of the longitudinally reciprocable sleeve 68, which are provided with cams for controlling the in and out movement of the crimping rolls. Said sleeves 68 are provided near their upper ends with collars 68', which are free to turn relative to the sleeves 68 on which they are mounted, but have no longitudinal movement relative thereto. Pins, or stub shafts, 69 are secured to the collars 68' and project through openings provided therefor in the longitudinally reciprocable plates 62, running in guide ways 61, and extend into the cam groove 64 in the cam 63, and are provided therein with rollers fitting in such cam groove 64.

The cam 63 being stationary, because secured to the tubular spindle 8, it will be apparent that the sleeves 68 are longitudinally reciprocated by the revolution of the crimping turret. The heads 68'' of sleeves 68 are provided with the cams $K^1$ and $K^2$, for controlling the in and out movement of the crimping roller control levers $L^1$ and $L^2$, which are provided with rollers 71, 71, where they contact with the cams.

The heads 68'' of the sleeves 68, to which the cams $K^1$ and $K^2$ are secured, are provided with grooves 72 for the reception of pins 73 on the crimping heads 74, and in this way the sleeves 68 turn with the crimping heads 74, but are free to move longitudinally with respect thereto.

The crimping roller $R^1$ is carried on a slide 75 on the head 74 and its shaft 76 is removably secured in place therein so that the crimping roller may be readily removed and replaced, when desired. The end of lever $L^1$ bears on an adjustable tappet bolt 77, secured to the slide 75. The roller $R^2$ is secured to slide 75' and has a similar adjustable tappet 77' to coact with lever $L^2$.

The crimping heads 74 are fixed on the tubular spindles 78, which are passed through the sleeves 68 and also through the openings 79 in the upper extensions 65 of the bearing members 60. The hollow spindles 78 are driven by pinions 80 meshing with the spur gear 81, which is fixed on shaft 82. Shaft 82 extends down through the tubular standard 8 and is driven from the drive shaft 1 by means of bevel gear 83 and bevel pinion 84. Means such as the collar 85 and the sleeve 85' are provided on the hollow spindles 78 to prevent lengthwise motion thereof.

The crimping disc D, which goes inside the cap $C^1$ is bolted or removably secured to the stem 86, which extends through and out the end of hollow spindle 78 and carries the interior crimping disc D on its lower projecting end. The upper end of stem 86 extends out beyond the top of hollow spindle 78. Means are provided for preventing rotation of the stems 86 and discs D. In the form shown, stems 86 are fastened together in pairs by means of tie-bars 87. Bearing thimbles 88 for the stems 86 are secured in the sleeve 85' on the hollow spindles 78, and are held in place by threaded locking rings 89. Collars 90 may be placed on the stems 86 to serve as thrust bearings and to hold said stems against lengthwise movement. Guards G are preferably provided over each of the crimping heads 74.

The can table 10 and the crimping turret 11 rotate together, one of the crimping heads 74 being permanently located over each of the can tablets 20. The crimping heads 74 do not move up or down, but the tablets 20 move up and down in the can table 10, being actuated by cam 24.

When the can is placed in the machine at the "can entry" position (Fig. 9) the tablet 20 is in down position and is raised by means of the cam 24 in the region of movement marked "tablet up," bringing disc D against the bottom of cap $C^1$. If the can should be somewhat over length, disc 29 may be depressed somewhat by the pressure of the can thereon. As neither the disc D nor the tablets 20 rotate on their axes, the can is held firmly and does not rotate on its axis, except that it may turn somewhat under the action of the crimping rollers, but such a slight rotation is incidental and is never considerable.

The sleeve 68 is moved downwardly by the cam 63 and the cam $K^1$ (which, it is to be noted, is lower down and closer to the lever $L^1$ than cam $K^2$ is to the lever $L^2$) engages lever $L^1$, as shown in Fig. 14, thus moving slide 75 and cam roller $R^1$ inwardly so that the bevelled lower portion 91 of roller $R^1$ contacts with the turned over margin 92 of the can cap $C^1$.

The head 74 carrying rollers $R^1$ and $R^2$, is constantly rotated at a rapid rate, due to the rotation of pinions 80, which mesh with the gear 81 on shaft 82. The revolution of the turret 11, with pinions 80 thereon, is preferably in the opposite direction from the revolution of shaft 82 and gear 81, and this results in a substantial increase in the rotative speed of pinions 80 and crimping heads 74.

The marginal flange 92 of the cap $C^1$ is thus quickly and effectively spun down by roll $R^1$ to the position shown in Fig. 17.

When the cam $K^1$ has moved down past roller 71 on lever $L^1$, roller $R^2$ is brought into crimping position by means of cam $K^2$, and the crimping is completed by the substantially cylindrical lower portion 93 of the roller $R^2$, which at the end of the downward stroke of sleeve 68 carrying head 68″ has reached the position shown in Fig. 18 and has crimped the margin 92 of cap $C^1$ close up to the flange 94 on the can head.

The disc D is preferably provided with the bead 95 at the extreme end thereof, and same serves to assist in bringing the parts of the cap close together to make a tight joint by expanding the material of the cap, as shown at 96, Fig. 18. The caps may be provided with "lining" material to assist in making a tight joint, if desired, but ordinarily this is not necessary, particularly with such filling materials as condensed milk.

When the crimping of the cap is completed, the can tablet 20 is lowered by cam 24 and the can with the cap crimped in place thereon is released.

It will be observed that when the hollow spindle 68 is raised, levers $L^1$ and $L^2$ are freed from the action of the cams $K^1$ and $K^2$. Slides 73 are thus freed to move outwardly under influence of centrifugal force, and are out of the way when a can is to be put into place. After the crimping of the caps is completed, the cans are pushed into contact with the curved discharge guide rail 97 by the gauges 33′ and pass out of the machine and are removed, by any suitable means, such as a conveyor (not shown).

I claim:

1. In a machine for crimping caps on outwardly flanged openings in can heads, a stem, means for holding said stem against rotation relative to the can, a disk on the end of the stem somewhat smaller than the recess in a cap, a rotating sleeve about said stem, and a plurality of crimper rolls mounted on said sleeve to move towards and away from said disk at such an angle that as they approach the disk they also move towards its outer end and vice versa, the crimper rolls being so related to the disk that the axes thereof if prolonged would at all times intersect the axis of the disk stem.

2. In a machine for crimping caps on outwardly flanged openings in can heads, a stem, means for holding said stem against rotation relative to the can, a disk on the end of the stem somewhat smaller than the recess in a cap, a sleeve rotating about said stem, a plurality of crimping disks slidably mounted in said sleeve at such an angle that as they approach the disk laterally they also move toward the end of the disk and vice versa, a second sleeve slidable on said first named sleeve, means on said last named sleeve for actuating the crimping disks to move in their slides, and means for imparting rotary movement from the first named sleeve to the last named sleeve.

3. In a machine for crimping caps about flanged openings in can heads, a stem, means for holding the stem against rotation relative to a can, an inverted conical disk fixedly secured to said stem, a sleeve rotating about said stem, brackets on said sleeve provided with slideways making an acute angle with the axis of said stem, slides in said slideways and carrying crimping rolls, levers pivoted to said brackets and adapted to actuate said crimping roller slides, a second sleeve rotating with the first named sleeve but longitudinally movable with respect thereto, and means on said last named sleeve for actuating said levers.

4. In a machine for crimping caps about flanged openings in can heads, a rotatable can carrying table, a plurality of can tablets movable up and down in said table, a turret rotating in unison with the table, a plurality of stems held against rotation in said turret in line with cap openings in cans on their tablets, inverted conical disks on the ends of said stems, rotating sleeves on the stems, crimping rolls mounted on said sleeves to move toward the end of the disk as they approach same laterally and vice versa, and a second set of sleeves rotating with but longitudinally movable on the first named sleeves, and means thereon to move the crimping rolls in succession toward the disk when the cans are elevated to bring the disks into engagement with the caps.

5. In a machine for crimping caps to can heads about an upwardly flanged opening formed in the can head, a continuously moving disk of size adapted to be received in the recess in the cap, a stem therefor, a rotatable hollow spindle in which the stem is received, crimping rolls on said spindle, and mounted for movement in and out thereon with respect to said disk, a sleeve on said hollow spindle and rotating therewith and longitudinally movable with respect thereto, means for elevating a continuously traveling can to bring said disk into the recess in its cap, and means controlled by the longitudinal movement of said sleeve when the can is in such elevated position for moving said crimping rolls over the top of a can head towards said disk to crimp the cap.

6. In a machine for crimping caps to can heads about a flanged opening formed in the can head, a revoluble can table, a revoluble turret over said table and revolving therewith, a series of can tablets movable up and down in said table, a series of spindles in said turret, disks on said spindles in line with the caps of cans carried on said tablets, cam means for raising and lowering said tablets and cans carried thereby, crimper rolls movable over the top of the cans carried upon said tablets so as to have movement simultaneously downward and toward said disks and vice versa, and cam means for actuating said crimper rolls so timed and related to the cam means actuating the can tablets as to move said crimping rolls over the tops of the cans into operative relation with said disks when said cans are in elevated position with the disk in place within the recess of the cap.

7. In a machine for crimping caps to can heads about a flanged opening in the can heads, a tubular post, a shaft extending therethrough, a sleeve revolubly mounted upon said post, a can table turning with said sleeve, a plurality of can tablets mounted for up and down movement in said can table, cam means for imparting up and down movement to said tablets, a turret turning with said sleeve, a series of stems in said turret in line with cap openings of cans carried on said can tablets, disks of a size adapted to be received within the recess in the can head caps, sleeves about said stems, a master gear upon the shaft extending through the hollow post, said last named sleeves having pinions meshing with said gear, whereby said sleeves are rotated, a plurality of crimping rolls movable over the tops of cans supported on said tablets and carried by and rotating with said sleeves, and means for moving said crimping rolls over the tops of the cans toward and away from said disks at an acute angle to the stem axis, so that movement of said crimping rolls towards said disks over the tops of the cans takes place when cans carried upon said can tablets are elevated to bring their caps into engagement with said disks.

8. In a machine for crimping caps to can heads about a flanged opening in the can heads, a hollow post, a shaft extending therethrough, a sleeve through which said post is past, means for rotating said shaft and sleeve in opposite directions, a can table and a turret over the can table and both turning with said sleeve, a series of can tablets in said table adapted for up and down movement therein, a series of non-rotating vertically fixed stems in said turret, disks on the ends of said stems in line with the cap openings in the heads of cans carried on said can tablets, sleeve members about said stems, pinion upon said sleeve members, a master gear upon said shaft and meshing with said pinions whereby said sleeve members are continually rotating at high speed, movable crimping rollers carried by said sleeve members and having a path of movement extending over the tops of the heads of cans supported on said tablets, and cam means for actuating said sleeve members to move said crimping rollers over the heads of the cans down and toward said disks and vice versa, and cam means for raising and lowering said can tablets and cans in their table, both of said cam means being so timed and interrelated that the crimping rollers are made to move over the heads of the cans to approach the disk to crimp a cap in place when the cans upon said tablets are elevated by their cam means with the caps thereof in engagement with said disks.

9. A can holding tablet comprising a ring having an inner flange, a can supporting member within the ring and limited in its movement by said flange, and spring means under said member and adapted to yieldably hold same up against said flange.

10. The combination of a rotatable table provided with a series of recesses and bores in central continuation of said recesses, can tablets in said recesses and having stems detachably secured thereto and extending through said bores and provided therebeyond with heads, cam rollers in said heads and said heads being provided with holes, and pins on the lower side of said table and running in said holes whereby the can tablets are prevented from rotating in the table.

11. The combination of a post, a turret rotatable thereon and made in two parts with a space therebetween, brackets securing the turret parts together, crimper heads mounted in said brackets and extending downwardly below both turret parts, and a cam for controlling the crimper heads secured to the post between the turret parts.

12. The combination of a revolving table, a turret thereover and revolving therewith, said turret comprising a pair of separated hubs, means for connecting said hubs together, crimper heads on the turret comprising a disk and a movable crimper roll to cooperate with the disk to crimp a cap in a flanged opening in a can head, and a cam between the hubs for controlling the movement of the crimper roll with respect to the disk.

13. The combination of a revolving can table, can tablets movable up and down therein as the table revolves, a turret revolving with the table, said turret comprising a pair of separated hubs and brackets for connecting the hubs together, spindles in said brackets and having disks thereon adapted to enter caps in cans on the tablets, crimping rolls concentrically related to said spindles, a cam between the turret hubs, and means actuated by the cam for bringing the crimping rolls into and out of coaction with said disks.

14. The combination of a revolving can table, can tablets movable up and down thereon, as the table revolves, a two-part turret revolving with the table and having a hollow center between the two turret parts, stems on the turret in line with cans on their tablets, disks on said stems, hollow spindles rotating about said stems, crimper rollers carried by said spindles, sleeves rotating with but longitudinally movable on said spindles and provided with means for moving the crimper rolls into and out of cooperation with said disks, and a cam within the hollow central portion between the two parts of the turret for actuating said sleeves.

15. The combination of a hollow post, a two part turret mounted to turn thereon, brackets securing the turret parts together, crimper heads in the brackets comprising a non-rotating disk on its stem, a hollow spindle on said stem provided with crimping rolls and having pinions secured thereto, a master gear for driving said pinions having its shaft extending through the hollow post, means for driving master gear and turret in opposite directions, a sleeve rotating with but longitudinally movable on said hollow spindle, means on said sleeve for moving the crimping rolls into and out of cooperative relation to said disk, and a cam on the hollow post between the turret parts for actuating said sleeve.

In witness whereof I have signed my name hereto.

GEORGE H. STEWARD.